Dec. 6, 1960     C. B. ASKE, JR., ET AL     2,963,325
VEHICLE WHEEL TRIM
Filed March 6, 1958     5 Sheets-Sheet 1
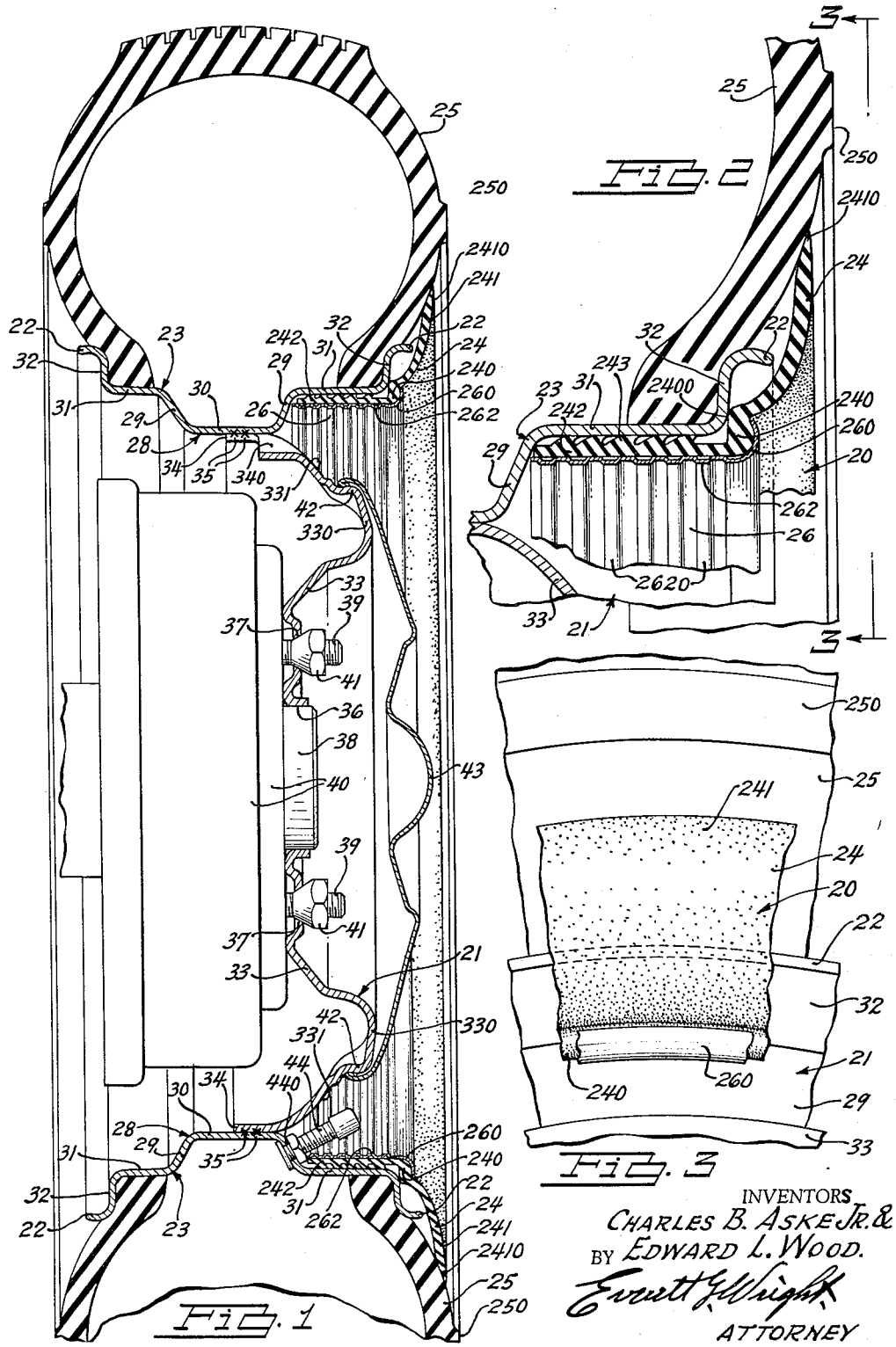
INVENTORS
CHARLES B. ASKE JR. &
BY EDWARD L. WOOD.
Everett G. Wright
ATTORNEY

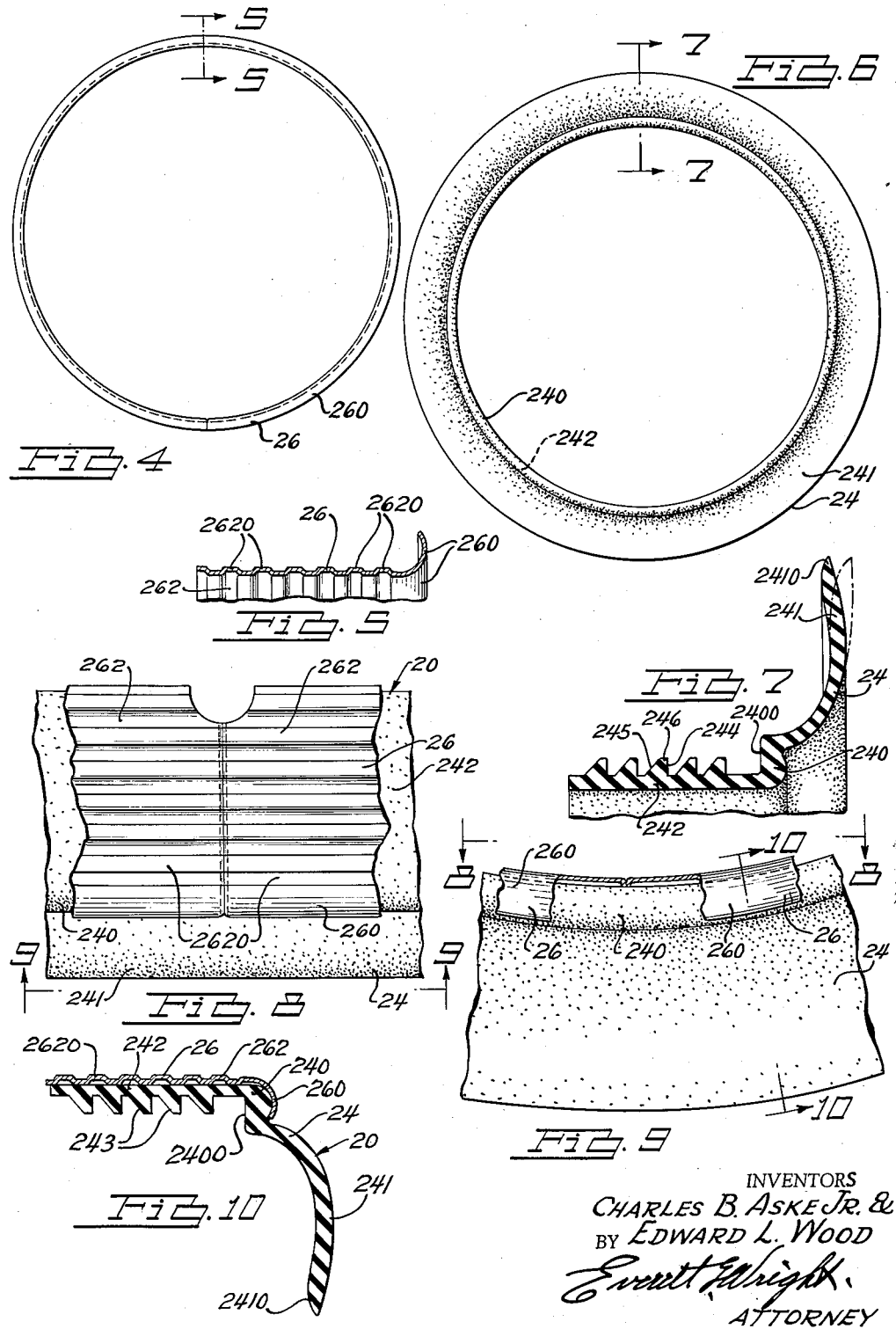

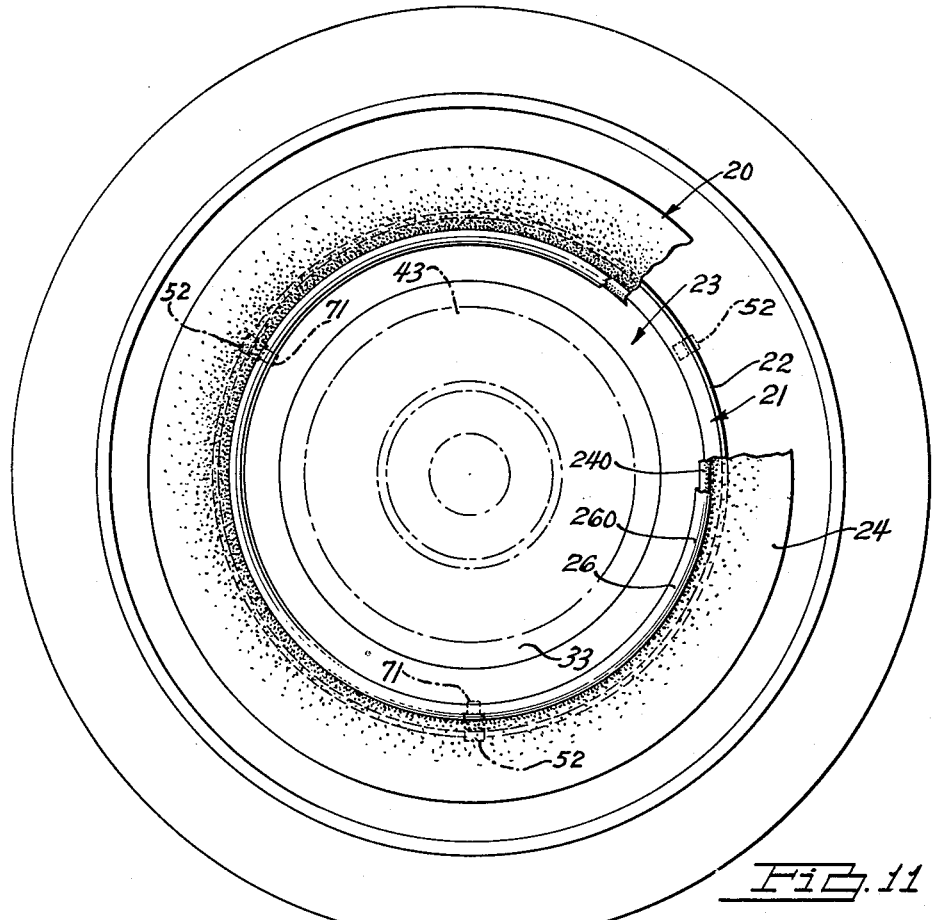
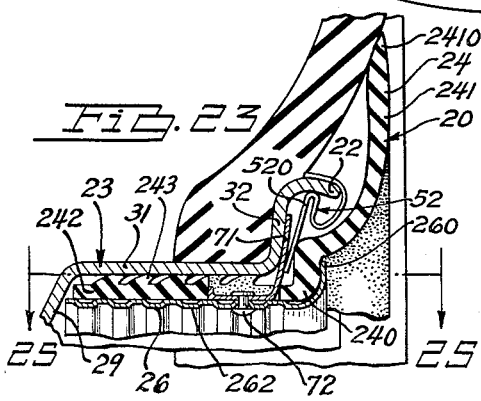
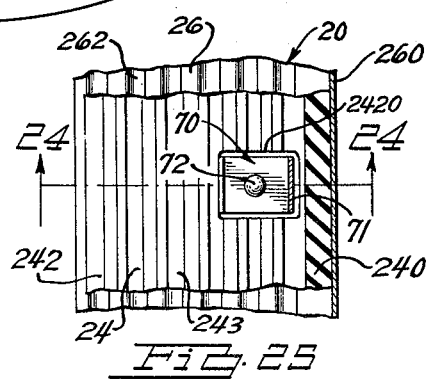
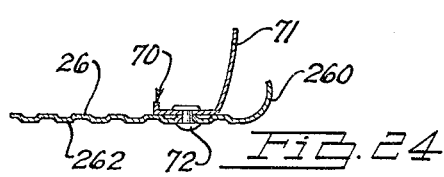

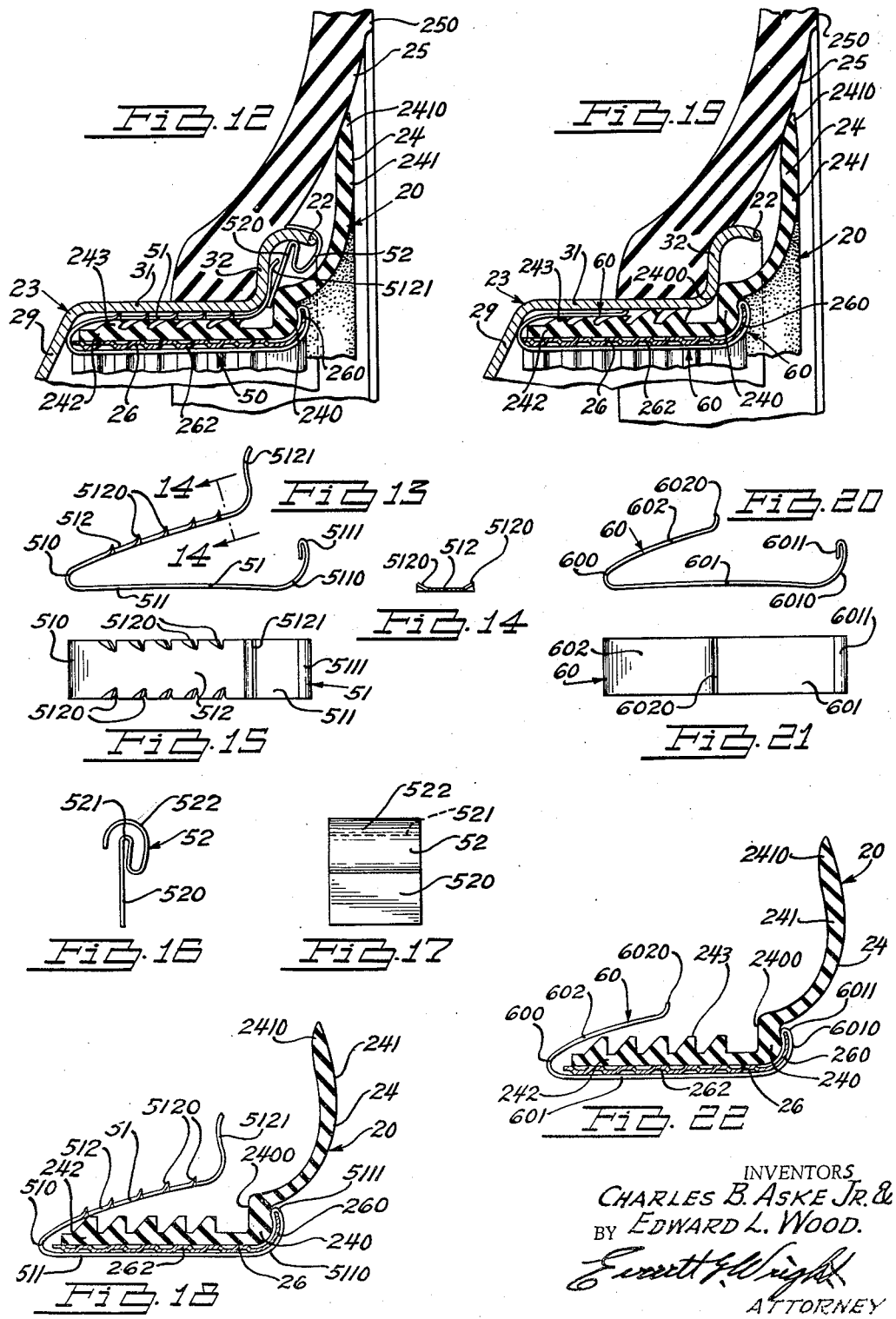

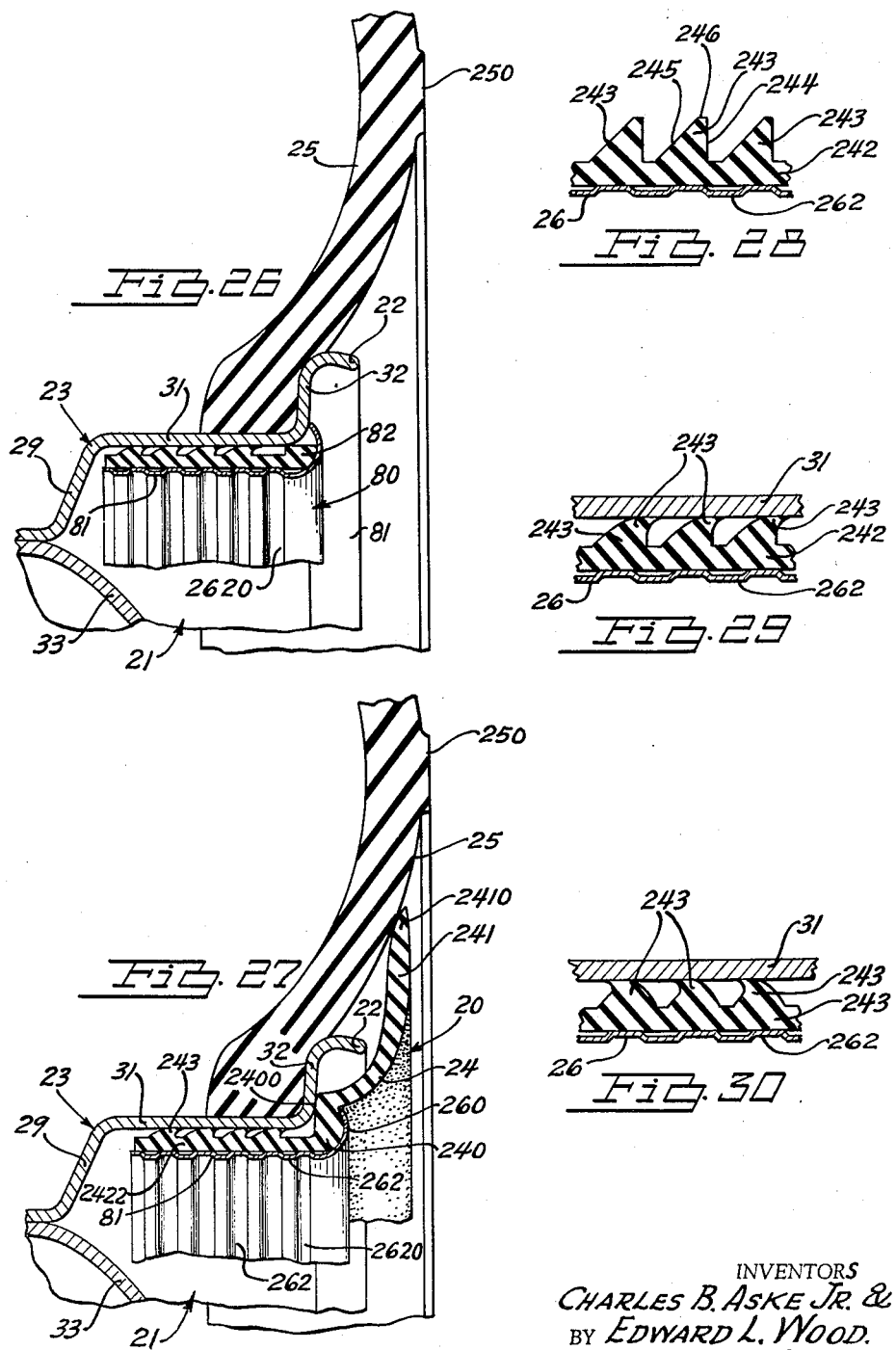

United States Patent Office 2,963,325
Patented Dec. 6, 1960

2,963,325

VEHICLE WHEEL TRIM

Charles B. Aske, Jr., 1278 Pilgrim Road, Birmingham, Mich., and Edward L. Wood, 4684 Audubon, Detroit, Mich.

Filed Mar. 6, 1958, Ser. No. 719,573

11 Claims. (Cl. 301—37)

This invention relates to vehicle wheel trim, and in particular to improved, effective and simplified means for trimming the vehicle wheel and the tire thereon to provide highly desirable over-all aesthetic effects at a minimum of cost.

In the prior art various means have been employed to trim vehicle wheels such as hub caps, hub caps with a trim at the outer flange of the wheel rim, and wheel covers. Wheel covers are not only relatively cumbersome but their use generally depreciates the normal wheel effect and gives an impression of a more or less hubless disc type wheel. Furthermore, wheel covers generally do not extend over the lip of the wheel rim, particularly when secured to the vehicle wheel by such means as a toothed or fingered band carried by the wheel cover. Wheel covers are expensive to manufacture, and, because of their weight are considered difficult to retain on vehicle wheels when various conventional forms of anchorage means are employed to removably secure them in place. The use of hub caps and trim at and/or over the outer flange of the wheel rim of vehicle wheels produces a somewhat desirable over-all wheel trim effect which, although having considerable aesthetic appeal, does not completely meet the demand for a substitute for or an improvement over wheel covers.

The use of white side wall tires in conjunction with conventional wheel trim is considered desirable, however the employment of both white side wall tires and conventional wheel trim to improve the appearance of vehicle wheels is not only uneconomical but is undesirable because of the generally recognized shorter life of white side wall tires. Furthermore, the use of white side wall tires does not overcome the undesirable and aesthetically poor relatively flat wheel effect obtained by the use of conventional wheel covers.

With the foregoing in view, the primary object of the invention is to provide improved, simplified, economical and pleasing trim for vehicle wheels which trims the underside of the tire bead seat of a vehicle wheel rim, and which also may provide a white or colored side wall tire effect, cover the lip of the rim, and generally enhance the over-all wheel and tire appearance.

Another object of this invention is to provide a wheel trim for vehicle wheels in the form of a rim trim at the underside of the tire bead seat of a vehicle wheel rim which, although itself has desirable aesthetic qualities, is preferably employed on vehicle wheels in combination with hub caps to effectively trim vehicle wheels thereby serving as an improvement over other forms of wheel trim such as wheel covers, rim flange trim, and other wheel trim presently employed.

Another object of the invention is to provide an improved, simplified and inexpensive wheel trim-tire trim for vehicle wheels which gives a large white side wall tire-small wheel effect with a deep reflective ornamental reveal between the wheel rim and the hub cap normally employed on the wheel, the said wheel trim and the tire trim being formed to cooperate in the securement of the said wheel trim-tire trim to the vehicle wheel.

Another object of the invention is to provide rim trim for the under side of the tire bead seat portion of vehicle wheels which has patterned reflective qualities to reflect the color of the uncovered portion of the wheel spider that portion of the wheel outwardly of the hub cap and inwardly of the tire bead seat thereby to incorporate a colored striped or other patterned wheel effect without the use of paint or enamel on the rim trim per se.

Another object of the invention is to provide a rim trim-tire trim for vehicle wheels including improved, inexpensive and simplified means for positively securing the same to a vehicle wheel.

Another object of the invention is to provide rim trim for vehicle wheels incorporating as an element thereof tire trim means for providing a white or colored side wall tire effect, the said combined rim trim and white or colored side wall tire trim consisting of simple and inexpensive to manufacture elements that may be easily and positively applied to vehicle wheels.

A further object of the invention is to provide a rim trim for vehicle wheels consisting of an annular trim element backed by a resilient circumferentially toothed element which engages and grips the underside of the tire bead seat of the wheel rim when the said annular rim trim element and the resilient toothed backing elements are axially telescoped within the axially disposed wheel annulus formed by the said underside of the tire bead seat of the wheel rim.

A further object of the invention is to provide in the aforesaid combination, a tire trim ring integral with and extending from said annular toothed backing element extending radially outwardly therefrom over the lip of the wheel rim and into contact with the tire wall axially and radially inwardly of the scuff bead of said tire.

A further object of the invention is to provide a combined tire trim and wheel rim trim wherein a tire trim element includes an axially disposed flange portion extending under the tire bead seat of the wheel rim and a tire trim portion extending radially outwardly from said flange portion over the lip of the wheel rim and in contact with the tire wall radially and axially inwardly of the scuff bead of the said tire, and a rim trim ring element which is positioned within the said flange portion of said tire trim element prior to placement on a vehicle wheel whereby the telescoping of the said rim trim ring with the said flange portion of said tire trim therein within the tire bead seat annulus of the vehicle wheel rim positively secures the said tire trim-wheel rim trim assembly axially and concentrically on said wheel.

A still further object of the invention is to provide a rim trim applicable to the normally axially exposed portion of the tire bead seat of a vehicle wheel having a tire mounted thereon including a resilient circumferentially toothed anchorage element disposed between said rim trim and the said exposed portion of the tire bead seat, the said anchorage element being replaceable by a like anchorage element having a radially disposed white or colored flange extending therefrom over the lip of the rim and over a portion of the tire wall whereby to provide in combination with the rim trim the effect of enlarged white or colored wall tires on said wheel.

Other objects of the invention will become apparent by reference to the following detailed description taken in connection with the accompanying drawings, in which:

Fig. 1 is a vertical sectional view through a vehicle wheel and tire equipped with rim trim-tire trim embodying the invention showing its relationship with respect to a typical modern vehicle wheel having a hub cap and tire thereon.

Fig. 2 is an enlarged fragmentary detailed sectional view of the rim trim-tire trim disclosed in Fig. 1.

Fig. 3 is a fragmentary elevational view taken on the line 3—3 of Fig. 2.

Fig. 4 is a side elevational view of the rim trim element preferably employed.

Fig. 5 is an enlarged sectional view taken on the line 5—5 of Fig. 4.

Fig. 6 is a side elevational view of the tire trim element preferably employed.

Fig. 7 is a cross sectional view taken on the line 7—7 of Fig. 6.

Fig. 8 is an enlarged fragmentary elevational view taken on the line 8—8 of Fig. 9 showing the improved rim trim and tire trim elements in their assembled relationship prior to installation on a wheel, the joint in the said tire trim element being shown opposite the valve stem notch therein.

Fig. 9 is a fragmentary elevational view of the rim trim and tire trim elements taken on the line 9—9 of Fig. 8.

Fig. 10 is a cross sectional view taken on the line 10—10 of Fig. 9.

Fig. 11 is a side elevational view of a vehicle wheel having a tire thereon equipped with wheel trim including rim trim and tire trim embodying the invention, dot and dash lines indicating the location of auxiliary anchorage means for removably securing the said wheel trim on the vehicle wheel if such be employed.

Fig. 12 is an enlarged fragmentary cross sectional view of rim trim-tire trim similar to that disclosed in Figs. 1-11 inclusive, except auxiliary anchorage means such as wrap-around and rim anchorage clips are employed.

Figs. 13, 14 and 15 and Figs. 16 and 17 show details respectively of the auxiliary wrap-around anchorage clips and the auxiliary rim anchorage clips employed in the construction shown in Fig. 12.

Fig. 18 is a cross sectional view of the rim trim-tire trim employing auxiliary wrap-around clip means disclosed in Figs. 12, 13, 14 and 15 assembled prior to installation onto a vehicle wheel.

Fig. 19 is an enlarged fragmentary cross sectional view of rim trim-tire trim similar to that disclosed in Figs. 1-11 inclusive, except another style of auxiliary wrap-around anchorage means is employed.

Figs. 20 and 21 show details of the auxiliary wrap-around clip employed in the construction shown in Fig. 19.

Fig. 22 is a cross sectional view of the rim trim-tire trim and the auxiliary wrap-around clip means disclosed in Figs. 19, 20 and 21 assembled prior to installation onto a vehicle wheel.

Fig. 23 is an enlarged fragmentary cross sectional view of rim trim-tire trim similar to that disclosed in Figs. 1-11 inclusive except auxiliary anchorage clip means have been fixedly installed on the rim trim with which rim clip anchorage means as shown in Figs. 16 and 17 co-operate.

Fig. 24 is a cross sectional view taken on the line 24—24 of Fig. 25 of the rim trim element showing a fixed anchorage clip secured thereto.

Fig. 25 is a horizontal sectional view taken on the line 25—25 of Fig. 23.

Fig. 26 is an enlarged sectional view similar to Fig. 2 showing how the rim trim of the invention may be used alone with only a rim trim anchorage element.

Fig. 27 is an enlarged sectional view similar to Figs. 2 and 26 showing rim trim-tire trim embodying the invention indicating how a tire trim element combined with a rim trim anchorage element may be substituted for the rim trim anchorage element of Fig. 26.

Fig. 28 is a greatly enlarged fragmentary sectional view of the wheel trim and the anchorage flange portion of the tire trim disclosed in Fig. 7.

Fig. 29 is a greatly enlarged fragmentary sectional view of the rim trim-tire trim assembly of Figs. 1 and 10 when pressed axially into anchored relationship within the axially disposed tire bead seat annulus of the vehicle wheel rim and disposed firmly against the bottom of the said tire bead seat showing the attitude assumed by the circumferential teeth of the anchorage portion of the tire trim when the rim trim-tire trim assembly is being positioned in or is disposed in anchored relationship on the vehicle wheel.

Fig. 30 is a greatly enlarged fragmentary sectional view similar to Fig. 29 showing the attitude assumed by the circumferential teeth of the anchorage portion of the tire trim when the rim trim-tire trim assembly is being removed from the vehicle wheel.

Referring now to the drawings wherein like reference numerals refer to like and corresponding parts throughout the several views, the embodiment of the invention disclosed in Figs. 1-11 inclusive consists of improved and highly effective vehicle wheel trim construction 20 which is disclosed in connection with a typical modern vehicle wheel 21 having a tubeless tire 25 mounted thereon.

The said vehicle wheel 21 has a drop center rim 23 composed of a central channel or drop center 28 having side walls 29 and a base 30. An annular tire bead seat 31 extends laterally outwardly from each side of the side walls 29 of the drop center 28, each said tire bead seat 31 terminating in a tire bead seat flange 32 extending upwardly therefrom which is curved at its upper portion to form an axially disposed outer lip 22. The said tire bead seat flange 32 is oft-times referred to as the wheel flange and the said lip 22 is oft-times referred to as the lip of the wheel rim. Within the drop center rim 23 is a wheel spider 33 having an axially disposed flange 34 which is secured to the central channel 28 of the drop center rim 23 by such means as welding at 35. The said wheel spider 33 is provided with a central hub aperture 36 with securing stud holes 37 spaced therearound to accommodate respectively the wheel hub 38 and wheel securing studs 39 extending from the brake drum 40 to which the wheel 21 is secured by means of the usual wheel securing nuts 41.

The flange 34 of the spider 33 is generally scalloped out and formed at 340 at intervals around the periphery thereof to provide added structural strength to the vehicle wheel 21. The spider 33 is generally formed with an annular axially outwardly extending collar 330 which is preferably provided with a plurality of hub cap retainer nubs 42 over which a conventional hub cap 43 is sprung for securement onto the vehicle wheel 21. The said spider collar has an annular exposed painted surface 331 extending from the outer periphery of the hub cap 43 to the bottom of the painted central channel or drop center 28 of the wheel rim 23 adjacent the outer side wall 29 thereof. The particular tire 25 illustrated in the drawings is a modern tubeless tire having a scuff bead 250, and, if a tubeless tire 25 is used on the vehicle wheel 21, a valve stem 44 is mounted in sealed relationship through the valve stem aperture 440 provided in the outer wall 29 of the drop center rim channel 28 of the rim 23 of the wheel 21.

The particular vehicle wheel trim 20 disclosed in Figs. 1-11 inclusive comprises two elements, a tire trim element 24 of rubber or other suitable material and a rim trim element 26 of stainless steel or other relatively rigid material, which element cooperates, not only to enhance and beautify the appearance of the vehicle wheel 21 and its tire 25, but also to removably secure the said wheel trim 20 onto the vehicle wheel 21 and over a portion of the tire 25 mounted thereon. The said tire trim element 24 and the rim trim element 26 are preferably assembled into a wheel trim assembly 20 prior to mounting on a vehicle wheel 21.

The tire trim element 24 of the wheel trim 20 preferably consists of an annular bead portion 240, an annular curved white or colored side wall portion 241 extending radially outwardly from said bead portion 240, and an annular anchorage flange portion 242 extending axially inwardly from said bead portion 240, the said annular anchorage flange portion 242 including a plurality of circumferential axially spaced teeth 243 disposed radially outwardly therefrom.

The rim trim element 26 of the wheel trim 20 preferably consists of an outer annular bead portion 260 and an annular ornamental sleeve portion 262 extending axially inwardly from said bead portion 260. The said bead portion 260 of the rim trim 26 conforms with and is juxtaposed to the bead portion 240 of the tire trim element 24 when the annular anchorage flange portion 242 of the tire trim element 24 telescoped over the annular sleeve portion 262 of the rim trim element 26. Figs. 8, 9 and 10 show the assembled relationship of the rim trim element 26 shown separately in Figs. 4 and 5 and the tire trim element 24 shown separately in Figs. 6 and 7. The ornamentation of the sleeve portion 262 of the rim trim element 26 is shown as circumferential ribs 2620 throughout the drawings and particularly in Fig. 5, which ribs have been found to be a preferable ornamentation; however, it is obvious that other ornamentation of the rim trim element 26 may be employed to provide other desirable reflective patterns which will pick up and reflect the color of the exposed painted surface 331 of the wheel spider 33.

Each of the circumferential radially outwardly disposed teeth 243 of the annular flange portion 242 of the tire trim element 24 is preferably formed substantially triangular in cross section with a generally radially disposed axially outwardly facing wall 244 and an axially inwardly sloping wall 245. The said radially disposed axially outwardly facing circumferential teeth 243 of the tire trim element 24 shown in enlarged detail in Fig. 28 are suitably spaced so as to permit the apex 246 thereof to flex axially outwardly and radially inwardly when the wheel trim assembly 20 is mounted axially onto a vehicle wheel 21 as hereinafter described. The apex 246 of each of the said circumferential teeth 243 is preferably slightly truncated as best shown in Figs. 7 and 28 so as to permit the said circumferential teeth 243 to roll over from their locked position against the bottom of the tire bead seat 31 of the rim 23 of the vehicle wheel 21 shown in Fig. 29 to their unlocked position shown in Fig. 30 to free the gripping of the said tire bead seat 31 by the said circumferential teeth 243 when said wheel trim assembly 20 is forcibly removed axially from a vehicle wheel 21 as hereinafter described.

The tire trim element 24 and the rim trim element 26 of the wheel trim 20 are of such a diameter in respect to each other that the anchorage flange portion 242 of the tire trim element 24 may be telescoped or otherwise firmly anchored in assembled relationship onto the sleeve portion 262 of the rim trim element 26, see Fig. 10. When the tire trim element 24 and the wheel trim element 26 of the wheel trim 20 are so assembled, the diameter of the apex 246 of the radially disposed axially outwardly facing circumferential teeth 243 is somewhat greater than the internal diameter of the annular tire bead seat 31 of the vehicle wheel 21.

The wheel trim assembly 20 is mounted on the vehicle wheel 21 by forcibly telescoping the said wheel trim assembly axially within the internal annulus of the tire bead seat 31 thereof. This deforms the circumferential teeth 243 of the anchorage flange portion 242 of the tire trim element 24 from their normal attitude shown in Fig. 28 to their gripping position shown in Fig. 29. The said tire trim assembly is axially pressed onto the vehicle wheel 21 until the inner axially facing flange 2400 of the bead portion 240 of the tire trim 20 is located in abutment with the flange 32 of the tire bead seat 31 of the said vehicle wheel 21. The wheel trim assembly 20 is now thoroughly and firmly anchored onto the rim 23 of the vehicle wheel 20, and the curved white or colored side wall portion 241 of the tire trim element overlies the lip 22 of the wheel rim 23 of the vehicle wheel 21 and its outer peripheral portion 2410 is flexed into contact with the wall of the tire 25 within the scuff bead 250 thereof, all as clearly illustrated throughout the drawings.

To remove the wheel trim assembly 20 from the vehicle wheel 21, the said tire trim assembly 20 is manually pulled axially outwardly therefrom. Initially, a relatively large force is required to move the wheel trim assembly from the vehicle wheel 21 because the circumferential teeth 243 of the tire trim element 24 first must be flexed and rolled over from their locked position shown in Fig. 29 to their unlocked position shown in Fig. 30 whereupon the complete removal of the wheel trim assembly 20 from the vehicle wheel 21 becomes relatively easy.

In circumstances wherein vehicle wheel trim 20 of the invention is sold for use on any one of a number of different vehicle wheels 21 of a given nominal size such as 14 inch or 15 inch wheels produced by different manufacturers for different vehicles of several model years, the diameter of the annular tire bead seat 31 of the vehicle wheel 21 of such different wheels may vary considerably. In a wheel trim 20 for a certain nominal size vehicle wheel 21, the circumferentially disposed teeth 243 of the anchorage flange portion 242 of the tire trim element 24 and the rim trim element 26 will normally accommodate the said wheel trim 20 to firm and well anchored installation on most vehicle wheels of such nominal size. However, auxiliary clip means 50, 60 and 70 hereinafter described or any combination of them may be employed to assure positive anchorage of vehicle wheel trim 20 of any nominal size embodying the invention to vehicle wheels 21 of the same nominal size having a tire bead seat form or diameter that may deviate materially from the standard or average dimensions for such nominal size wheel.

In Figs. 12–18 inclusive, a preferred type of auxiliary anchorage means 50 is disclosed. A plurality of auxiliary anchorage means 50, for example three, may be employed when required because of abnormal dimensional variations in the standard or average form or diameter of the tire bead seat 31 of the wheel 21 upon which wheel trim 20 embodying the invention may be installed.

The said auxiliary anchorage means 50 preferably consists of a wrap-around clip 51 and a rim clip 52, both formed of relatively stiff spring steel. The wrap-around clip 51 is preferably formed of polished stainless steel as shown in Figs. 13, 14 and 15 into a horizontally open loop 510 having divergent arms 511 and 512. The lower arm 511 as shown in Fig. 13 is curved at 5110 to conform to the shape of the bead portion 260 of the rim trim element 26, and is hooked at 5111 to engage the said bead portion 260 of the rim trim element 26. The upper arm 512 of the said open loop 510 is formed to provide a plurality of upwardly or radially outwardly disposed burrs 5120 which bite into the tire bead seat 31 of the wheel rim 23 when wheel trim 20 employing the auxiliary anchorage means 50 is installed on a vehicle wheel 21, see Fig. 12. The outer end of the said upper arm 512 of the loop 510 of the wrap around clip 51 is preferably formed with an upwardly disposed finger 5121 as viewed in Fig. 13, which finger 5121 is formed to lie against the tire bead seat flange 32 of the wheel rim 23 as shown in Fig. 12 when wheel trim 20 employing auxiliary anchorage means 50 is installed on a vehicle wheel 21.

The wrap around clip elements 51 of the auxiliary anchorage means 50 are engaged on the wheel trim assembly 20 as shown in Fig. 18, and the wheel trim assembly 20 with the wrap around clip elements 51 thereon is mounted on the rim 23 of a vehicle wheel 21 as shown in Fig. 12.

After the said wheel trim assembly 20 is mounted on the vehicle wheel 21, the side wall portion 241 of the tire trim element 24 is flexed outwardly from the wall of the tire 25, and a rim clip 52 is mounted on the lip 22 of the wheel rim 23 with its arm 520 disposed over the finger 5121 of the wrap around clip 51 as shown in Fig. 12. The said rim clip 52 is formed as shown in Figs. 16 and 17 with a short arm 520 reversedly bent to provide a bearing at 521 and an open looped head 522. When the open looped head 522 of the rim clip 52 is forced over the lip 22 of the wheel rim 23, the looped head overlies the top of the said rim lip 22 while the bearing 521 thereof engages the bottom of the said rim lip 22 whereupon the arm 520 of the said rim clip 52 is sprung firmly against the said finger 5121 of the upper arm 512 of the wrap around clip 51 holding it firmly against the tire bead seat flange 32 of the wheel rim 23. Obviously, the rim clip 52 could be omitted from the auxiliary anchorage means 50, and the wrap around clip element 51 could be used alone. The use of the rim clip 52 in combination with the wrap around clip element 51 being preferable if and when extreme deviation from normal standard or average tire bead seat dimensions for any nominal sized wheel is encountered.

Figs. 19–22 inclusive show a preferred form of auxiliary anchorage clip means 60 which may be used in place of the auxiliary anchorage means 50. The said auxiliary anchorage clip means 60 is formed of relatively stiff spring metal into a horizontally disposed open loop 600 having divergent arms 601 and 602. The lower arm 601 as shown in Fig. 20 is curved at 6010 to conform to the shape of the bead portion 260 of the rim trim element 26, and is hooked at 6011 to engage the said bead portion 260 of the rim trim element 26. The upper arm 602 of the said loop 600 is relatively short and has its outer end 6020 bent sharply upwardly as shown in Fig. 20 so that the said outer end 6020 of the said upper arm 602 of the anchorage clip 60 will engage and bite into the tire bead seat 31 of the wheel rim 23 when wheel trim 20 employing the auxiliary anchorage means 60 as shown in Fig. 22 is installed on a vehicle wheel 21, see Fig. 19.

Referring now to Figs. 23, 24 and 25, an alternate auxiliary anchorage means 70 is disclosed therein and consists of a rim clip 52 and relatively stiff spring finger 71. The said spring finger 71 is secured by a rivet 72 to the outer periphery of the trim element 26 near the bead portion 260 thereof, and is formed to lie against the tire bead seat flange 32 as shown in Fig. 23 when wheel trim 20 employing auxiliary anchorage means 70 is installed on a vehicle wheel 21. The anchorage flange portion 242 of the tire trim element 24 is cut out at 2420 to accommodate the said spring finger 71. Wheel trim 20 employing a plurality of alternate anchorage means 70 spaced at equal intervals therearound is installed on the vehicle wheel 21 by first assembling rim trim 26 equipped with spring fingers 71 and the tire trim element 24, then pressing the said assembly axially within the annular tire bead seat 31 of the vehicle wheel 20, and finally applying rim clips 52 over the lip 22 of the wheel rim 23 in the manner hereinbefore described in connection with the installation of the auxiliary anchorage means 50 so that the arm 520 of a rim clip 52 is sprung firmly against each finger 71 of the rim trim element 26 as best shown in Fig. 23.

Fig. 26 shows the invention in the form of wheel trim construction 80 consisting of a rim trim element 81 similar to the rim trim element 26 of the wheel trim construction 20 and an anchorage ring element 82 similar to the anchorage flange 242 of the tire trim element 24 of the wheel trim construction 20. This form of the invention may be employed in cases wherein the vehicle owner prefers the normal black wall tire and is desirous of employing rim trim only. This construction also may be employed when the vehicle is already equipped with white side wall tires, and the vehicle owner is desirous of adding the rim trim.

Fig. 27 directly below Fig. 26 shows a normal wheel trim construction 20 employing a tire trim element 24 in place of the anchorage ring element 82 of the wheel trim constructtion 80 shown in Fig. 26, and using the narrower rim trim element 81 of the wheel trim construction 80 shown in Fig. 26 together with a corresponding narrow anchorage flange 2422 on the tire trim element 24.

Thusly, wheel trim construction 80 consisting of rim trim and an anchorage means of the invention may be changed to wheel trim construction 20 consisting of rim trim and tire trim, or vice versa, by merely changing one element of the combination giving the consumer a choice as to which of the two forms of wheel trim he may prefer.

Although but a single embodiment of the invention together with alternate and auxiliary constructions have been disclosed and described in detail, it is obvious that many changes may be made in the size, shape, arrangement and details of the various elements of the invention, all without departing from the spirit and scope thereof as defined by the appended claims.

We claim:

1. In a vehicle wheel structure including a wheel rim with a tire mounted thereon, said wheel rim having an outer tire bead seat presenting an axially outwardly disposed annulus, the combination therewith of a wheel trim comprising a relatively rigid annular rim trim element including an annular bead portion and a sleeve portion extending axially inwardly therefrom, and a resilient annular anchorage element including an annular bead portion and an axially disposed sleeve portion telescoped in assembled relationship firmly over the sleeve portion of said annular rim trim element forming a unitary wheel trim assembly mounted on said wheel rim, said sleeve portions of said rim trim element and said anchorage element being of substantial width in respect to said tire bead seat annulus, said sleeve portion of the said resilient anchorage element being provided with a plurality of axially spaced circumferentially disposed teeth which flex and become compressed in firm engagement with said tire bead seat annulus when said wheel trim assembly is mounted on said vehicle wheel by forcibly telescoping it within the said outwardly disposed tire bead seat annulus.

2. In a vehicle wheel structure as claimed in claim 1 wherein the said axially spaced circumferentially disposed teeth of the sleeve portion of said resilient anchorage element are formed to slope axially outwardly whereby to flex more readily as they are compressed against the said tire bead seat annulus when said wheel trim assembly is mounted on said wheel than when it is withdrawn therefrom.

3. In a vehicle wheel structure including a wheel rim with a tire mounted thereon, said wheel rim having an outer tire bead seat presenting an axially outwardly disposed annulus, the combination therewith of a wheel trim member including an inwardly axially disposed sleeve element having an outer diameter less than the inner diameter of said wheel rim annulus, and a resilient annular anchorage element telescoped in assembled relationship firmly over said wheel trim element forming a unitary wheel trim assembly mounted on said wheel rim, said sleeve elements being of substantial width in respect to said tire bead seat annulus, said annular anchorage element being formed with a plurality of axially disposed circumferential teeth on the radial outer face thereof having an outer diameter greater than the inner diameter of said tire bead seat annulus, said wheel trim assembly being mounted on said vehicle wheel by forcibly telescoping it within the said outwardly disposed tire bead seat annulus of said vehicle wheel with the circumferential teeth of said resilient anchorage element flexed into firm engagement with said tire bead seat annulus.

4. In a vehicle wheel structure comprising a wheel rim having axially disposed inner and outer annular tire bead seats and a tire mounted thereon, the outer tire bead seat forming an axially disposed annulus, the combination therewith of a wheel trim consisting of an axially disposed annular resilient anchorage member having a plurality of radially disposed axially spaced circumferentially continuous flexible teeth slightly larger than the radially inner annulus of the outer tire bead seat, and an ornamental annular axially disposed metal ring telescopingly assembled within the said annular resilient anchorage member sizing the same mounted on said wheel rim, the said flexible teeth of said anchorage member being formed to flex more readily axially outwardly than inwardly of said tire bead seat annulus, the said ornamental metal ring and said annular resilient anchorage member being substantially axially parallel and substantially axially coextensive of each other and the said outer tire bead seat annulus, the said wheel trim assembly being readily telescoped axially within the said outer tire bead seat annulus into a firm and positive engagement with said tire bead seat with the said flexible teeth flexed outwardly providing a substantial initial resistance against removal of the wheel trim assembly from said vehicle wheel.

5. In a vehicle wheel structure including a wheel rim with a tire mounted thereon, said wheel rim having an outer tire bead seat presenting an axially outwardly disposed annulus, a wheel and tire trim assembly comprising a relatively rigid wheel trim element including an annular sleeve portion, the combination therewith of a tire trim element comprising a resilient annular radially disposed tire trim portion and a resilient axially disposed annular anchorage sleeve portion extending axially inwardly from said tire trim portion provided on its radially outer face with a plurality of circumferentially disposed resilient teeth formed integrally therewith, the said annular anchorage sleeve portion of said tire trim element being assembled over the annular sleeve portion of said wheel trim element forming the wheel and tire trim assembly mounted on said wheel rim, said tire trim portion of said tire trim element being formed to flex against the outer wall of said tire when said wheel and tire trim assembly is telescopingly mounted on said vehicle wheel with the annular resilient anchorage sleeve portion of said tire trim element flexed in firm engagement with said tire bead seat annulus.

6. In a vehicle wheel structure as claimed in claim 5 wherein the said axially spaced circumferentially disposed teeth of the anchorage sleeve portion of the tire trim element are formed to slope axially outwardly whereby to flex more readily when the said wheel and tire trim assembly is telescopingly mounted on said wheel than when it is withdrawn therefrom.

7. In a wheel structure for vehicle wheels including a wheel rim having tire bead seats and a tire mounted thereon, the outer tire bead seat forming an axially disposed annulus, the combination therewith of a wheel trim consisting of a tire trim element including a resilient annular radially disposed tire trim portion and an integral resilient axially disposed anchorage flange portion substantially coextensive of said tire bead seat annulus, said tire trim portion being formed to flex against the axial outer wall of said tire, and an annular rim trim element substantially axially coextensive of the said annular anchorage flange portion of said tire trim element assembled therewithin sizing the same mounted on said wheel rim to permit said wheel trim to be mounted with the anchorage flange portion of said tire trim element firmly but removably telescoped within the said outer axially disposed tire bead seat annulus of said wheel rim.

8. In a vehicle wheel including a rim of the type having an axially disposed tire bead seat annulus and a tire mounted on said wheel rim, the combination of a wheel trim assembly comprising a relatively rigid axially disposed rim trim ring and a resilient annular anchorage element disposed around said rim trim ring, both substantially axially coextensive of the said tire bead seat annulus of said wheel rim, the outer periphery of the said resilient anchorage element including a plurality of axially spaced circumferentially continuous teeth therearound slightly larger in diameter than said tire bead seat annulus, the said assembly being telescopingly mounted in said tire bead seat annulus with the said teeth of the anchorage element flexed axially outwardly into gripping engagement with the said tire bead seat annulus when the wheel trim assembly is telescopingly mounted on said wheel, removal of the said wheel trim assembly from said tire bead seat annulus requiring a substantial initial axially outward force to first reverse the said flexed disposition of said teeth to permit the said wheel trim assembly to be telescoped from said tire bead seat annulus.

9. In a vehicle wheel including a rim of the type having an axially disposed tire bead seat annulus and a tire mounted on said wheel rim, the combination of a wheel trim assembly set forth in claim 8 including an auxiliary anchorage means for said wheel trim assembly consisting of a spring element wrapped partially around said wheel trim assembly at intervals around its periphery, each said auxiliary anchorage means spring element including teeth adapted to bite into the said tire bead seat when the said wheel trim assembly is telescoped therewithin, the said auxiliary anchorage means spring element including a finger positionable against the tire bead flange of the outer tire bead seat of said wheel rim when the said wheel trim is mounted on said vehicle wheel, and spring clip means including a loop sprung onto the outer lip of the wheel rim and an arm depending from said loop adapted to engage the said finger of said auxiliary anchorage means spring element and constantly urge it in its normal position against said outer tire bead seat flange thereby preventing axial movement of said wheel trim assembly.

10. In a vehicle wheel including a rim of the type having an axially disposed tire bead seat annulus and a tire mounted on the said wheel rim, the combination of a wheel trim assembly set forth in claim 8 including an auxiliary anchorage means for said wheel trim assembly consisting of a spring element wrapped around said wheel trim assembly and hooked to the annular bead portion of said annular rim trim element at intervals therearound, each said anchorage means spring element including a sharply bent outwardly facing end formed to engage and bite into said tire bead seat when the said wheel trim assembly is telescoped therewithin thereby preventing axial movement of said wheel trim assembly after having been telescopingly mounted in said tire bead seat annulus.

11. In a vehicle wheel including a rim of the type having an axially disposed tire bead seat annulus and a tire mounted on the said wheel rim, the combination of a wheel trim assembly set forth in claim 8 including an auxiliary anchorage means consisting of a plurality of circumferentially spaced fingers fixed to the outer periphery of said ornamental annular rim trim and extending through an aperture formed in said annular anchorage element positionable against the flange of the tire bead seat of the wheel rim when the said wheel trim assembly is mounted on said vehicle wheel, and spring clip means including a loop sprung onto the lip of the wheel rim and an arm depending from said loop adapted to engage said finger and constantly urge it in its normal position against said tire bead flange thereby preventing axial movement of said wheel trim assembly after having been telescopingly mounted in said tire bead seat annulus.

References Cited in the file of this patent

UNITED STATES PATENTS

| | | |
|---|---|---|
| 1,920,575 | Lyon | Aug. 1, 1933 |
| 1,985,378 | Lyon | Dec. 25, 1934 |
| 2,736,610 | Waite | Feb. 28, 1956 |
| 2,812,215 | Waite | Nov. 5, 1957 |

FOREIGN PATENTS

| | | |
|---|---|---|
| 1,061,278 | France | Nov. 23, 1953 |